May 10, 1932. W. T. D. CAMPAIGNE 1,857,493

THREAD CHASER

Filed Feb. 28, 1929

Inventor
William T. D. Campaigne,

Attorney

Patented May 10, 1932

1,857,493

UNITED STATES PATENT OFFICE

WILLIAM T. D. CAMPAIGNE, OF SPOONER, WISCONSIN

THREAD CHASER

Application filed February 28, 1929. Serial No. 343,389.

The object of the invention is to provide a tool for the restoration of damaged threads in bolts or pipe and rotatable, without any adjustment, to clean or renew the threads whether they be right-hand or left-hand; to provide a tool in which the cutter may be fed to the threads by hand during the operation of truing the same; and to provide a tool which consists of but few parts and is therefore of simple form and susceptible of cheap manufacture and low marketing cost.

Figure 1:
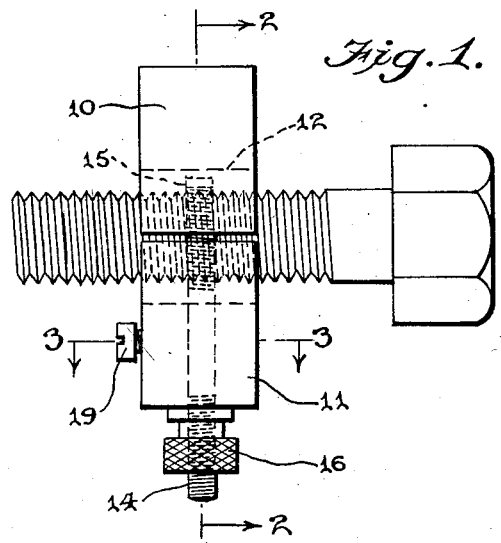

With this object in view the invention consists in a construction and combination of parts of which a preferred embodiment is illustrated in the accompanying drawings, wherein:

Figure 1 is an elevational view showing the invention applied as a chaser or truing tool on the threads of a cap screw.

Figure 2:
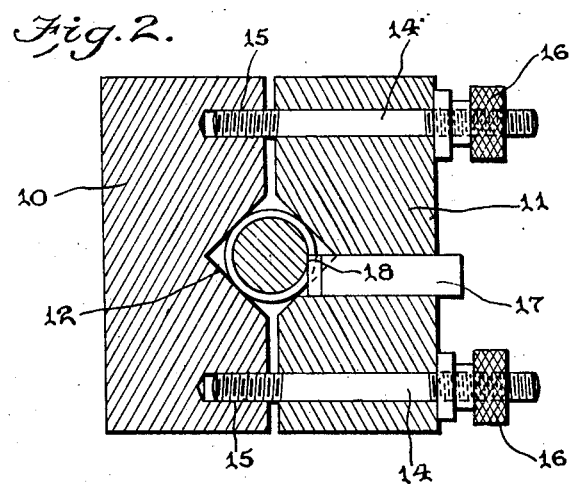
Figure 3:
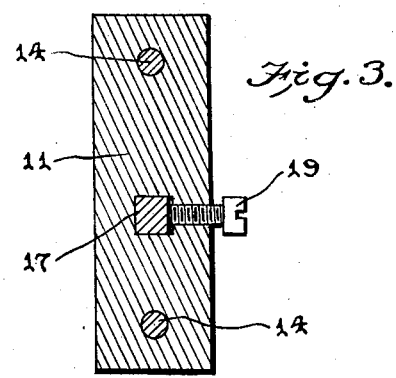

Figures 2 and 3 are sectional views on the planes indicated by the lines 2—2 and 3—3 respectively of Figure 1.

The invention consists of the clamp block 10 and cutter block 11 in the two of which is formed a polygonal opening 12 which, in the illustrated embodiment, is square. The opening is formed by recessing the two blocks on their contacting edges and the diagonal of the opening is coincident with said contacting edges. The two blocks are adjustably secured together by means of studs 14 which are secured to the block 10, preferably by threads as indicated at 15, and these studs extend through openings in the block 11, receiving on their upper threaded ends the knurled nuts 16 by means of which the two may be clamped on a bolt or pipe inserted through the opening 12.

The cutter 17 which is preferably formed of high speed steel is adjustably mounted in a cross-sectionally polygonal slot in the block 11, the slot conforming to the cross-sectional contour of the cutter, and the cutting edge 18 of the latter which is formed to conform to the angle of the threads to be operated upon invades that part of the opening 12 in the block 11, one face of the cutter lying in the diagonal line of the opening at right angles to the line of contact between the two blocks. A set screw 19 is threadingly mounted in the block 11 in a hole bored through the side of the block and entering the tool slot, so that the screw may bear upon the cutter and retain it in position after it has been adjusted to extend into its proper position in the opening 12.

In the operation of the device, the nuts 16 are rotated to permit separation of the blocks 11 and 10 and the screw or pipe with the damaged threads is inserted through the opening 12, the cutter being seated between two adjacent threads, preferably those which have not been marred. The nuts 16 are then rotated to bring those sides of the opening 12 in the block 10 into contact with the screw and the tool then is rotated, the cutter 18 truing the threads as the tool is advanced therealong. If the thread to be trued be left-hand, it is placed on the work in the opposite direction than where the thread be right-hand—that is the work enters the tool from the opposite face in the one case from where it does in the other. The cutter may be initially adjusted to cut the full depth of thread but the initial operation need be only to take a light cut, increasing the cuts on succeeding operations by the adjustment towards each other of the two blocks through the tightening of the nuts 16. By this plan, the block 10 will always bear on the work but the block 11 will remain out of contact with the latter until the full depth of cut is accomplished.

By reason of the position of the cutter 17 in the block 11, one corner of the lower end constitutes the cutting edge and if this should become dull by constant use, the cutter may be withdrawn and turned 180° on its longitudinal axis when the opposite edge of its lower end becomes a cutting edge. Thus the two edges may be used before sharpening of the cutter becomes necessary.

The invention having been described what is claimed as new and useful is:

A thread chaser consisting of a pair of blocks, studs carried in the edge of one block and extending through holes in the other to bring the two into edge facing position, each block being recessed on its face contacting with the other to provide a polygonal opening existing half in one and half in the other, nuts engaged with the studs and bearing on the block having sliding engagement with the studs, and a cutter carried by the latter block and invading the opening defined by the two, the cutter being cross-sectionally polygonal and extending through a correspondingly shaped slot formed in the block by which it is carried, and a set screw threadingly engaged with said block and bearing upon the cutter to maintain the adjustment of the latter, the stud-carrying block bearing on the work but the cutter-carrying block being held by the cutter out of contact with the work until the full depth of cut is accomplished by the repeated adjustment of said nuts.

In testimony whereof he affixes his signature.

WILLIAM T. D. CAMPAIGNE.